(12) United States Patent  
Zarns

(10) Patent No.: US 7,185,136 B2  
(45) Date of Patent: Feb. 27, 2007

(54) METHODS AND SYSTEMS FOR REMOTELY ACCESSING UNIVERSAL SERIAL BUS DEVICES

(75) Inventor: Michael L. Zarns, Plymouth, MN (US)

(73) Assignee: Digi International Inc., Minnetonka, MN (US)

( * ) Notice: Subject to any disclaimer, the term of this patent is extended or adjusted under 35 U.S.C. 154(b) by 0 days.

(21) Appl. No.: 11/115,652

(22) Filed: Apr. 27, 2005

(65) Prior Publication Data

US 2005/0210176 A1  Sep. 22, 2005

Related U.S. Application Data

(63) Continuation of application No. 10/047,481, filed on Oct. 23, 2001, now Pat. No. 6,904,489.

(51) Int. Cl.
*G06F 13/36* (2006.01)

(52) U.S. Cl. .................................................... 710/315

(58) Field of Classification Search ............... 710/315, 710/11, 105
See application file for complete search history.

(56) References Cited

U.S. PATENT DOCUMENTS

| | | | |
|---|---|---|---|
| 5,754,780 A | | 5/1998 | Asakawa et al. |
| 5,809,015 A | | 9/1998 | Elliott et al. |
| 6,040,792 A | * | 3/2000 | Watson et al. ............... 341/100 |
| 6,061,794 A | | 5/2000 | Angelo et al. |
| 6,070,214 A | | 5/2000 | Ahern |
| 6,162,809 A | * | 12/2000 | Kohl et al. ................. 514/274 |
| 6,219,736 B1 | | 4/2001 | Klingman |
| 6,356,968 B1 | | 3/2002 | Kishon |
| 6,389,029 B1 | | 5/2002 | McAlear |
| 6,389,560 B1 | | 5/2002 | Chew |
| 6,501,463 B1 | | 12/2002 | Dahley et al. |
| 6,584,519 B1 | | 6/2003 | Russell |
| 6,603,744 B2 | | 8/2003 | Mizutani et al. |
| 6,618,788 B1 | | 9/2003 | Jacobs |
| 6,633,583 B1 | | 10/2003 | Esterson |
| 6,708,247 B1 | | 3/2004 | Barret et al. |
| 6,732,212 B2 | | 5/2004 | Sugahara et al. |
| 6,802,015 B2 | | 10/2004 | Atkinson |
| 6,842,797 B1 | * | 1/2005 | Lawande ..................... 710/35 |
| 6,904,489 B2 | * | 6/2005 | Zarns .......................... 710/315 |
| 7,024,478 B1 | * | 4/2006 | Dalgic et al. ............... 709/225 |
| 2002/0083143 A1 | * | 6/2002 | Cheng ......................... 709/208 |
| 2002/0178295 A1 | | 11/2002 | Buczek et al. |

FOREIGN PATENT DOCUMENTS

| | | |
|---|---|---|
| GB | 2355375 | 4/2001 |
| WO | WO 9703527 A2 * | 1/1997 |
| WO | WO 9909488 A1 * | 2/1999 |
| WO | WO-00/57587 | 9/2000 |

* cited by examiner

*Primary Examiner*—Paul R. Myers  
(74) *Attorney, Agent, or Firm*—Schwegman, Lundberg, Woessner, & Kluth, P.A.

(57) ABSTRACT

Methods and systems for remotely accessing a universal serial bus device are provided. A requesting device issues a request for a universal serial bus device. The request is intercepted and packaged and then transmitted over a network. The packet is received by a universal serial bus host device having a universal serial bus controller and being in direct communication with the universal serial bus device. The packet is unpackaged into the request, and the request is passed to the controller for processing by the device.

25 Claims, 6 Drawing Sheets

METHODS AND SYSTEMS FOR REMOTELY ACCESSING UNIVERSAL SERIAL BUS DEVICES

CROSS-REFERENCE TO RELATED APPLICATIONS

This application is a continuation of U.S. application Ser. No. 10/047,481, filed on Oct. 23, 2001 now U.S. Pat. No. 6,904.489, which application is incorporated herein by reference.

FIELD OF THE INVENTION

The present invention is related to remote access to universal serial bus devices, and more particularly to methods and systems for accessing universal serial bus devices remotely across a network.

BACKGROUND OF THE INVENTION

In recent years, the computer peripheral industry, the computer chip industry, and the computer software industry have joined together to create standards which have allowed standard hardware devices and interfaces to be developed. The standard devices and interfaces permit improved integration and communication between the computing devices and the computing peripheral devices. The emerging standard has become widely known as the Universal Serial Bus (USB) standard.

The USB standard permits peripherals to be readily connected to computing devices with virtually no manual configuration being required by an end user during initial setup. In effect, USB enabled devices allow seamless plug and play with one another. Generally, the USB architecture includes 5 primary components: USB ports on the USB enabled peripheral device and on the USB enabled computing device which is interfaced to the peripheral device, a USB cable connecting the peripheral device to the computing device via the USB ports, a USB device driver residing on the computing device which translates a request to access the peripheral device into a USB formatted request, a USB stack which is low-level data (e.g., stored in memory) and sets of executable instructions that manages the USB formatted request, and a USB host controller which interfaces with the USB stack and sends the USB formatted request across the USB cable to the peripheral device.

The USB host controller is embedded as electromechanical devices that reside on the computing device, within the addressable address space of the processing element or processing elements of the computing device. Moreover, the USB device driver and the USB stack are sets of executable instructions operable to execute on the processing element(s). The USB controller manages all communication occurring over the USB cable, allowing the peripheral to communicate directly with the computing device. Yet, the USB device driver communicates indirectly with the USB controller by interfacing all USB language formatted data requests through the USB stack.

As one skilled in the art appreciates, the USB standard has significantly improved peripheral interactions with a host computing device. However, the USB standard has substantial limitations on any end user's desired configuration of the host computing devices and the corresponding peripheral devices. For example, peripherals must normally be directly connected to the host computing devices, and the physical distance from the host computing devices to the peripheral devices is limited. As a result, end users have little success or options when there is a need to network USB peripheral devices to their computing devices, especially when any desired network occurs over a physical distance in excess of 5 meters, which is generally the maximum USB cable length available.

To alleviate this problem a number of techniques have been attempted. For example, USB bridges or USB cable extension boxes have been developed providing a hardware USB controller embedded in cables (e.g., USB bridges) or boxes (e.g., USB cable extension boxes) in order to increase the physical distance from which a host computing device can communicate with a peripheral device. Yet, this solution involves customized hardware and electro mechanical devices, and the solution still imposes physical distance limitations on the communications between the host computing device and the peripheral device.

In recent years, a technology, referred to as "thin clients," has attempted to permit an end user to work on a severely constrained processing element to interact with one or more main processing elements, configured on a remote server. This gives the end user the illusion that he/she is working on a locally powerful processing element, while most communications are actually being processed remotely on the server. In some thin client architectures, the local end user's computing device and display include a USB port having the ability to connect an end user's local peripheral device to the local computing device by using a standard USB cable. However, the end user is still severely constrained as to the physical placement of the peripheral with respect to the local device. Further, the end user is still required to purchase and obtain customized hardware permitting the thin client architecture.

Therefore, what is needed is methods and systems for providing more flexible configurations and interactions associated with a peripheral device and an end user's local computing device.

SUMMARY OF THE INVENTION

According to one aspect of the present invention, a method of remotely interacting with a universal serial bus device is provided, wherein a request originating on a requesting device is intercepted. The request seeks access to the universal serial bus device and is packaged into an intermediate request, with the intermediate request being transmitted to a servicing device having a universal serial bus controller. The intermediate request is then unpackaged back into the request and passed to the controller for processing by the universal serial bus device.

According to yet another aspect of the present invention, a method of processing a remote request in order to access a local universal serial bus device is provided, wherein a request is received from a remote requesting device in a first format. The request is associated with a desired access of a local universal serial bus device. The first format is rendered to a universal serial bus language format and provided to a universal serial bus controller for servicing by the local universal serial bus device.

According to still another aspect of the present invention, a method to communicate with a remote USB device over a network is provided, wherein communication data is issued from an issuing device. The communication data directed to the remote USB device using a device driver set of executable instructions to translate the communication data into peripheral data which is operable to be processed by the remote USB device. The peripheral data is then intercepted and transmitted over the network to a remote peripheral controlling device. The controller is operable to deliver the peripheral data to the remote peripheral device.

According to yet another aspect of the present invention, a remote universal serial bus system is provided. The system includes a system network, a universal serial bus controller connected to the system network, a universal serial bus device connected to the universal serial bus controller, a processor connected to the system network. The processor includes a set of executable instructions corresponding to the universal serial bus device, and a universal serial bus stack set of executable instructions operable to intercept universal serial bus request and to transmit the universal serial bus request to the remote universal serial bus controller over the system network. Further, the remote universal serial bus controller receives the universal serial bus request from the system network and passes the universal serial bus request to the universal serial bus device for processing.

In still another aspect of the present invention, a system capable of communicating with a remote universal serial bus (USB) device is provided. The system includes a communications medium, a local processing element, and a remote processing element. The remote processing element communicates with the local processing element over the communications medium. Furthermore, the remote processing element includes a USB port which can be connected to a USB device. Moreover, the local processing element includes a local controller which intercepts a communication intended for a USB device and transmits the communication over the communications medium to the remote processing element. The remote processing element receives the communication and provides it to the USB port.

DESCRIPTION OF THE PREFERRED EMBODIMENTS

In the following detailed description of various embodiments of the present invention, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

Furthermore, as used herein a computing device includes one or more processing elements coupled with computer readable memory which can be volatile or non-volatile memory or any combination thereof. Additionally, the term "controller" as used herein includes both electro mechanical devices customized to perform specific algorithms or sets of executable instructions operable to execute on one or more processing elements to perform specific algorithms.

Figure 1:
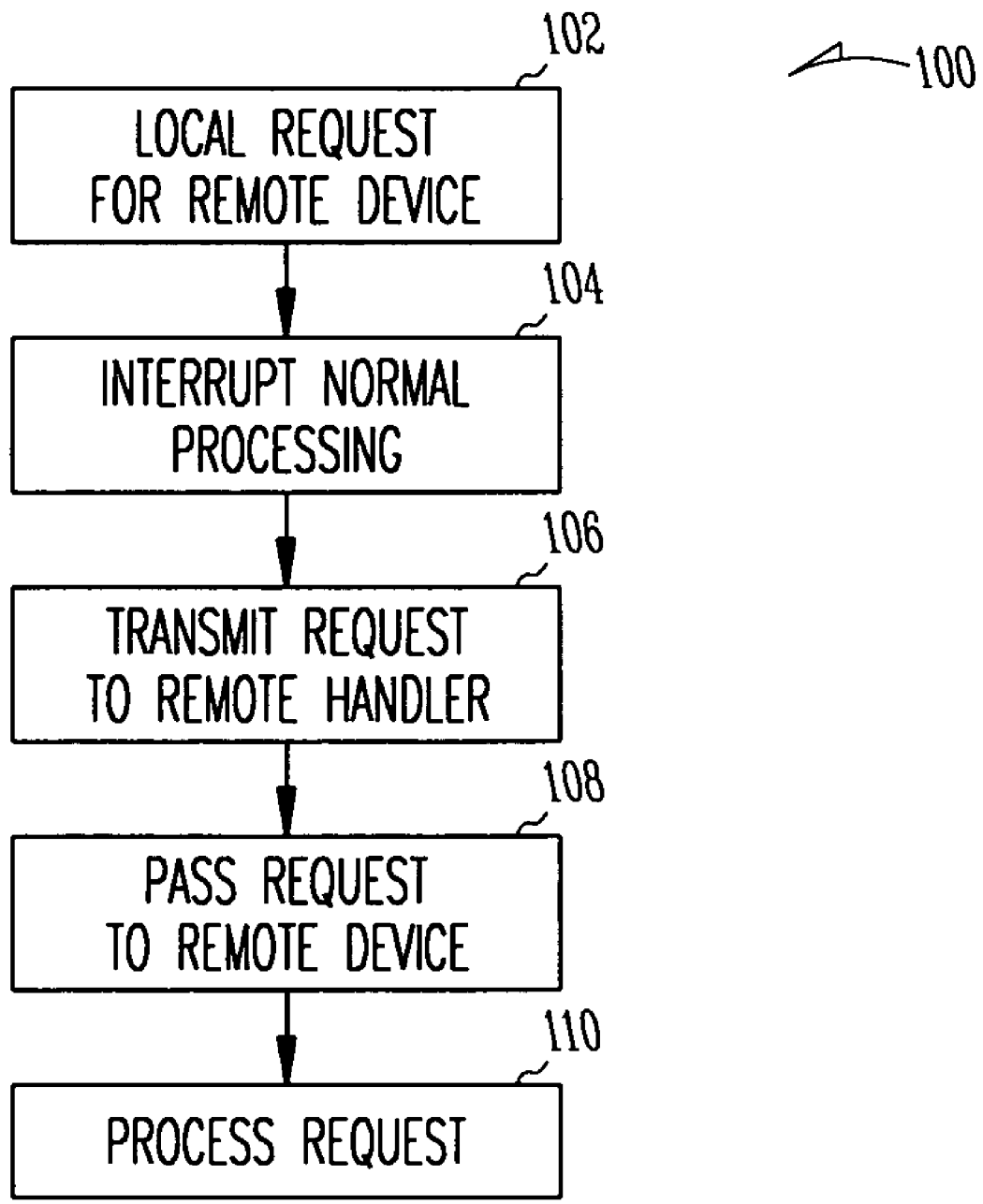
FIG. 1 shows one flowchart of a method of communicating with a remote device according to the present invention.

FIG. 1 shows one flowchart for one method 100 to communicate with a remote device. Initially, a local request for a remote device is made in step 102. The local request occurs on a local computing device having one or more processing elements in communication with local memory. The request includes, in some embodiments, commands and data associated with the remote device. The remote device, in some embodiments, includes peripheral computing devices, such as printers, facsimiles, cameras, portable audio devices, mass storage devices, and the like.

In step 104, the normal processing on the local computing device is interrupted. In one embodiment, the request is initially handled by a device driver set of executable instructions which translates the request into a data format recognizable by the remote device. Next, the translated data is placed on a stack, which associated with a hardware controller for the remote device, where processing is interrupted by directly accessing the stack memory within the local computing device or by modifying a stack set of executable instructions to interrupt processing when the translated data is detected on the stack memory.

Once normal processing is interrupted, the translated data is packaged into a network protocol or intermediate data format and transmitted to a remote handler in step 106. The remote handler is not directly connected to the local computing device and in some embodiments includes a processor element in communication with a memory. Moreover, the remote handler is in direct communication with the remote device. In step 108, the remote handler unpackages the request from its network protocol or intermediate format, and the request is directly passed or otherwise provided to the remote device. In some embodiments, the request is passed to a hardware controller for the remote device with resides on the remote handler and is sent across a data bus directly connected to the remote handler and the remote device.

Finally, in step 110 the request is processed by the remote device. As one skilled in the art will readily appreciate, in some embodiments the remote device is a USB enabled peripheral device and the remote handler is a processing element having a USB controller for the peripheral device. Further, the local computing device communicates with the remote handler via any network connection, including an Internet connection using TCP/IP communication. In this way, an end user using a local computing device which has a standard Internet connection to a remote handler (e.g., any remote computing device) is capable of directly interfacing to a USB peripheral device (e.g., remote device) when the USB peripheral device is directly connected via a USB cable to the remote handler. This indirect communication occurs without the addition of electro mechanical devices, and permits USB seamless integration across great physical distances. As a result, an end user readily achieves any desired configuration of his/her local computing device to a remote peripheral device.

Figure 2:
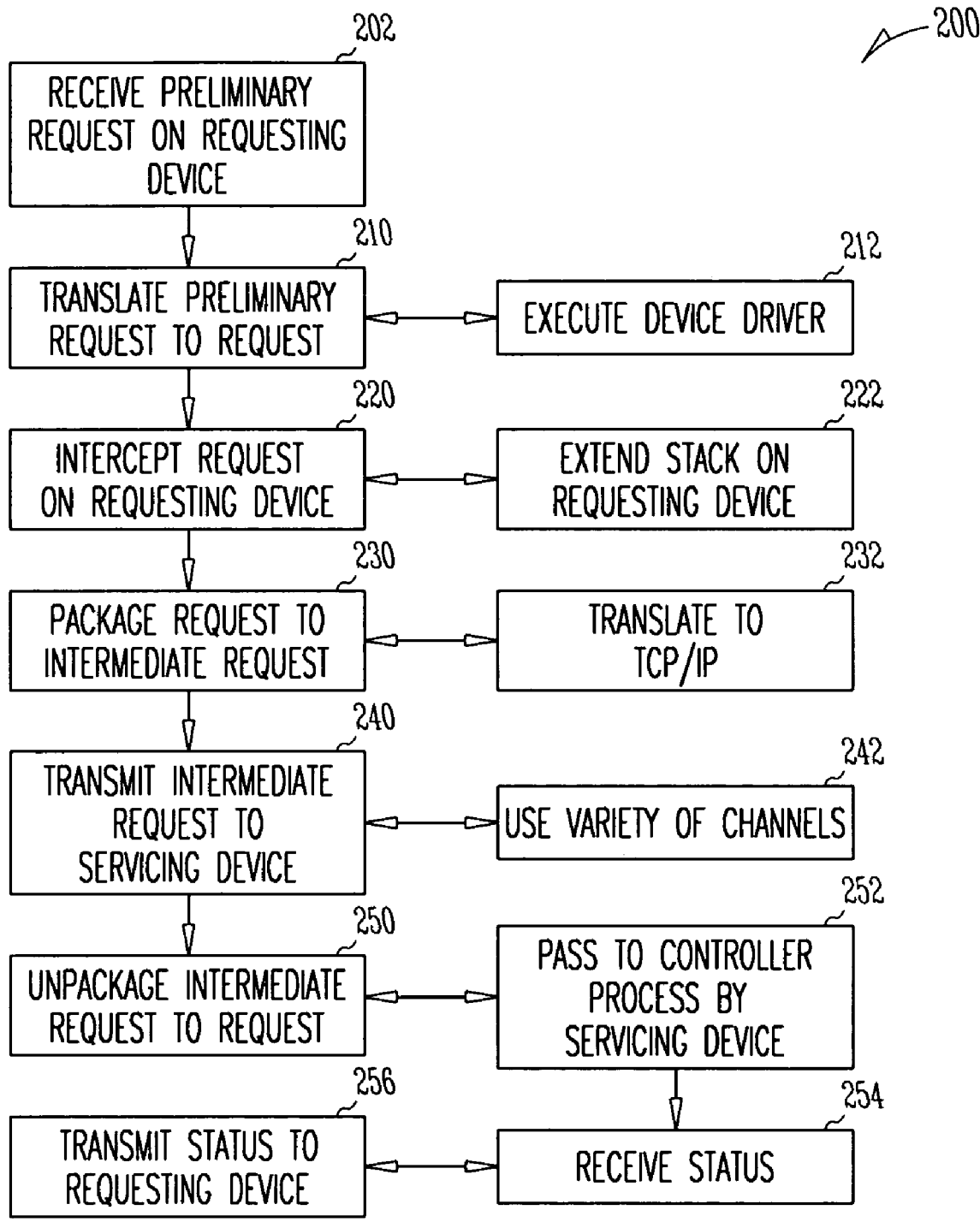
FIG. 2 shows one flowchart of a method of remotely interacting with a universal serial bus device according to the present invention.

FIG. 2 shows one flowchart for one method 200 of remotely interacting with a universal serial bus device. In step 202, a preliminary request is received on a requesting device. In some embodiments, a preliminary request is an end user directed command and the corresponding data which is couples the command. The command is directed to a servicing device, such as a peripheral device. A servicing device includes a printer, a facsimile, a camera, a portable audio device, a mass storage device, a mouse, a keyboard, a speaker, a microphone, a serial port, a bar code reader, a signature capture pad, a magnetic strip reader, a scanner, and the like. Further, the servicing device is USB-enabled.

As one skilled in the art will readily recognize, the requesting device itself need not have a USB port or any USB device driver associated with the requesting device. In these embodiments, the tenets of the present invention enable an otherwise non-USB enabled device to communicate with a USB-enabled servicing device.

In step 210, the preliminary request is translated into a request. In some embodiments the translation occurs by using a standard USB device driving set of executable instructions residing and executing on the requesting device as depicted in step 212. The request is in a USB language format recognizable by USB stacks. However, before any electro mechanical devices residing on the requesting device attempt to process the request from the USB stack memory, in one embodiment the request is intercepted at step 220. In some such embodiments, the interception occurs with a customized set of executable instructions operable to detect and modify the stack memory within the requesting device. In other such embodiments, the USB stack implementation itself is modified. In either case, whether directly or indirectly, the USB stack residing on the requesting device is extended in step 222.

Once the request has been intercepted, the request is prepared for transmission to a remote USB controller by packaging the request into an intermediate request in step 230. In some embodiments, this packaging is implicit with the use of standard networking protocols, such as TCP/IP (e.g., step 232) and others. In these situations, standard networking software will package the request into the intermediate request. In other embodiments, the request may be more elaborated packaged into an intermediate request by using a variety of data formats such as extensible markup language (XML) format, and others.

The packaged intermediate request is transmitted to a desired servicing device which has a USB controller in step 240. Here, transmission occurs using a single network channel or a variety of channels (e.g., step 242). Furthermore, channels include Internet channels, wireless channels, cable channels, satellite channels, radio frequency channels, plain old telephone lines (POTS), infrared channels, and the like. In step 250, the USB controller or a separate processing set of executable instructions unpackages the intermediate request to form the original request in step 250. Next, the USB controller passes the request to the servicing device in step 252, where the request is processed.

In some embodiments, the servicing device issues status data relating to the processing of the request. The status data includes, error information, current processing state information, completion information, and the like. The status data is received from the servicing device in step 254 and transmitted back to the requesting device in step 256. In this way, the requesting device follows the progress of the request made to a remote USB device and seamless interacts with a remote USB device as if the remote USB device where locally attached to the requesting device.

Figure 3:
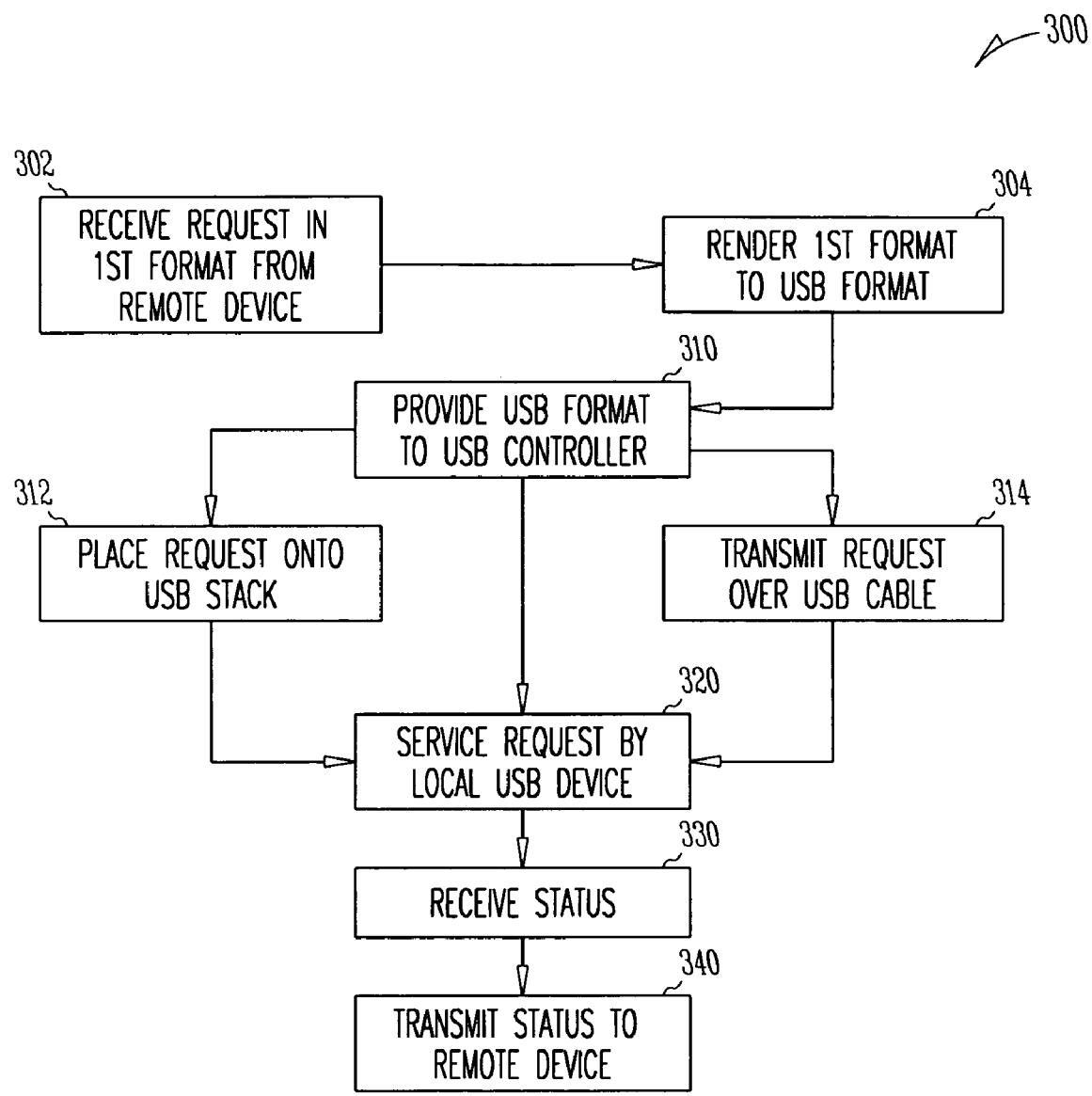
FIG. 3 shows one flowchart of a method for processing a remote request to access a local universal serial bus device according to the present invention.

FIG. 3 shows one flowchart of one method 300 for processing a remote request to access a local universal serial bus device. A local USB device is associated a local interface device such as a local computing device having one or more processing elements coupled with memory, and a USB controller operable to interface with a local USB stack and provide a request over a USB cable to the USB device.

A request in a first data format is received from a remote computing device in step 302. The first data format, in some embodiments, include a request in standard networking data format, such as TCP/IP. Alternatively in other embodiments, the first data format is XML, or other standard data format. Regardless of the first data format, the request in the first data format is rendered to a USB format in step 304. In this way, an initial request in a non USB compliant format is placed in the proper USB format in step 304. As one skilled in the art will appreciate, a variety of off-the-shelf rendering software utilities can be used to achieve a USB compliant format. For example, in some embodiments if the first data format is a raw request which was originally transmitted then the local interface device will pass the first format directly to a USB device driver set of executable instructions to achieve the USB compliant format. Moreover in other embodiments, extensible style sheets language (XSL) applications are customized to convert a first format in XML to a USB compliant format.

In step 310, the request in USB compliant format is made available to the USB controller for servicing by the local USB device in step 320. In some embodiments, the request is provided to the local USB device by transmitting the request over a USB cable in step 314. Moreover, in some embodiments the request is inserted into the local interface device's stack memory in step 312, where a standard USB controller manages the stack memory and the communication with the local USB device.

Further, in some embodiments a status associated with processing the request on the local USB device is received by the local interface device in step 330. The status is then transmitted to the remote device which originally initiated the request in step 340.

Figure 4:
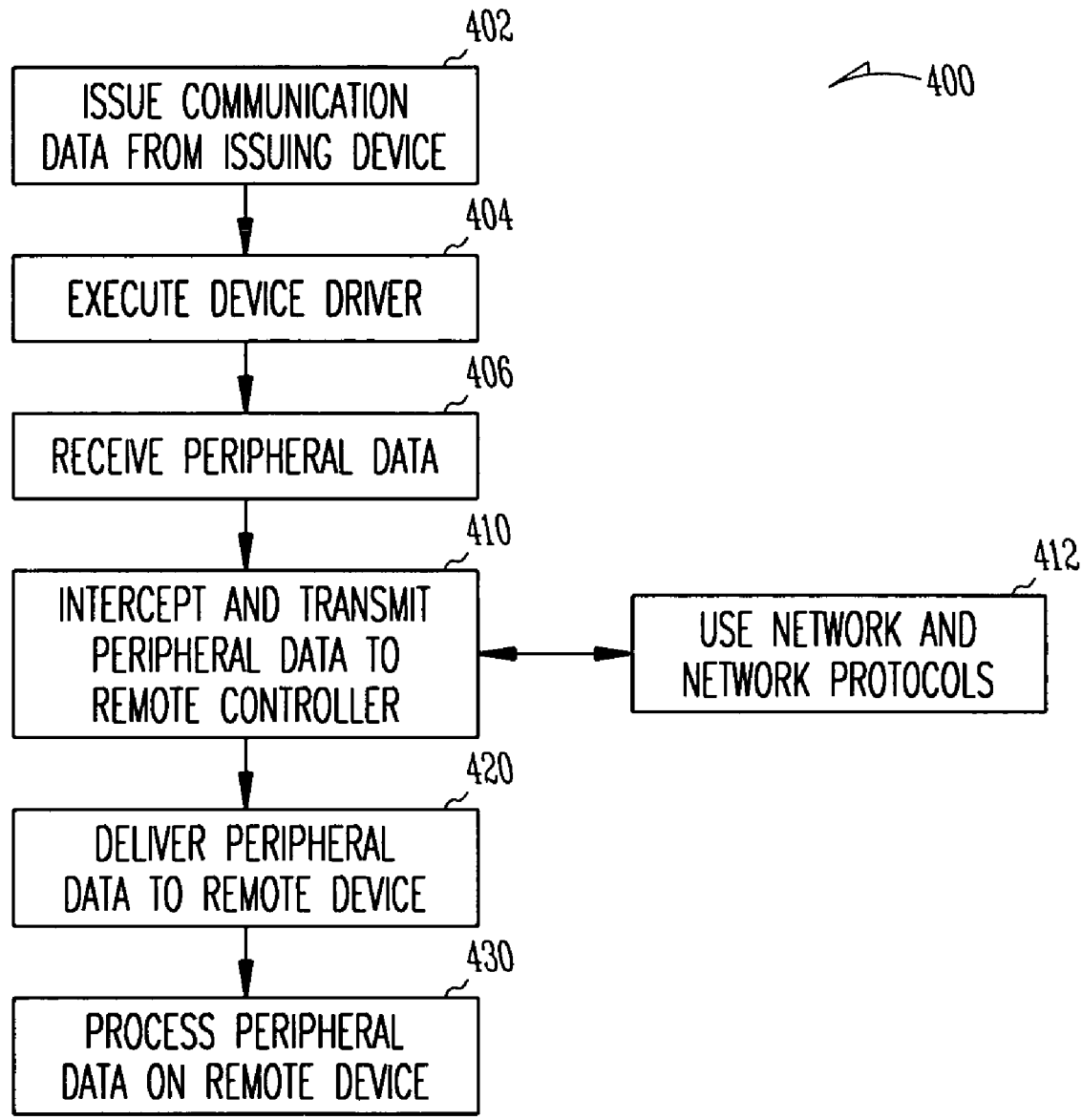
FIG. 4 shows one flowchart of a method of communicating with a remote peripheral device according to the present invention.

FIG. 4 shows one flowchart of one method 400 for communicating with a remote USB device over a network. Initially in step 402 communication data is issued for an issuing device. Communication data includes command instruction data and processing data used by the command instruction data, wherein the communication data is directed to a USB peripheral device. Moreover, the issuing device includes a user computing device having one or more processing elements coupled with memory. The issuing device is not directly connected to the peripheral device, correspondingly the communication data is directed to a remote USB device accessible to the issuing device indirectly over a network connection or interface.

However, the issuing device includes a device driver set of executable instructions operable to translate the communication data into peripheral data. Accordingly, the communication data is passed to the device driver set of executable instructions in step 404 for execution. The peripheral data is operable to be processed by the remote USB peripheral. In step 406 upon conclusion of the executed device driver set of executable instructions, the peripheral data is received by the issuing device. The peripheral data is then intercepted and transmitted to a remote peripheral controlling device in step 410 over the network. As previously presented, transmission occurs over any network configuration using any network protocol, now known or hereafter developed. The remote peripheral controlling device then delivers the peripheral data to the remote USB device in step 420 where the data is processed in step 430.

Figure 5:
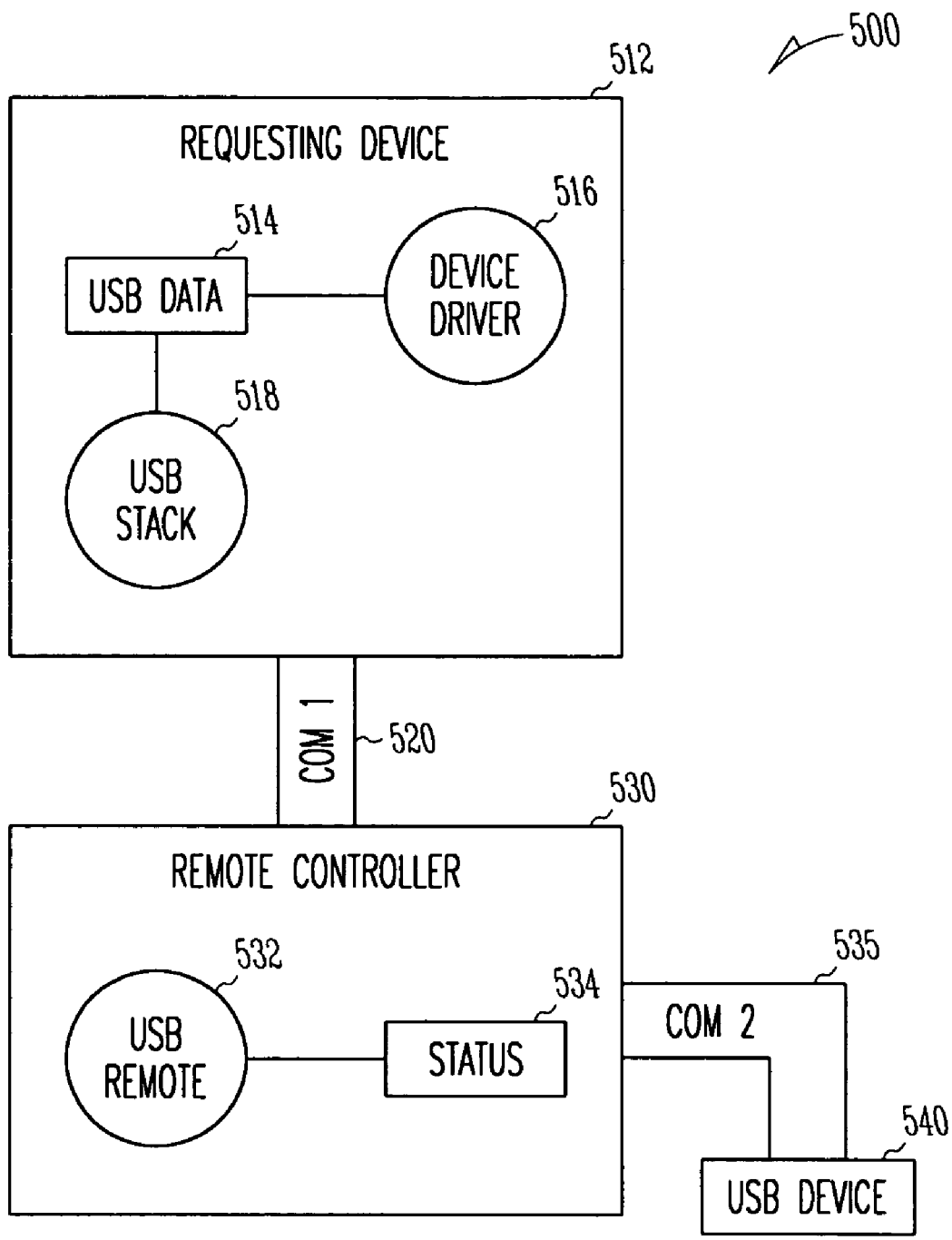
FIG. 5 shows one block diagram of a remote universal serial bus system according to the present invention.

FIG. 5 shows one block diagram for one remote USB system 500 that remotely processes USB data 514 on a remote USB device 540. The system 500 includes USB data 514 and a USB stack set of executable instructions 518. The USB data 514 is generated from a device driver set of executable instructions 516 residing on a requesting device processor 512. Furthermore, a USB stack set of executable instructions 518 resides on the requesting device processor 512 and is operable to intercept the USB data 514 on the requesting device processor 512 and transmit the USB data 514 to a remote USB controller 530 over system network (COM1) 520, where the remote USB controller 530 passes the USB data 514 received (not depicted in FIG. 5) to a remote USB device 540 for processing.

Transmission from the requesting device 512 to the remote USB controller 530 occurs over system network 520 having one or more communication channels COM1. COM1, in some embodiments, includes one or more wireless channels, Internet channels, radio frequency channels, infrared channels, satellite channels, cable channels, and the like. Additionally, communication over system network 520 occurs with any standard protocol language such as, and by way of example only, TCP/IP. Further remote USB controller 530 passes the USB data 514 to the remote USB device 540 for processing using communications channel COM2 535. COM2 535 in some embodiments include a direct USB cable connection between the remote USB controller 530 and the remote USB device 540.

Moreover in some embodiments, a USB remote set of executable instructions 532 resides on the remote USB controller 530 and is operable to receive a status 534 from the remote USB device and transmit the status 534 to the requesting device processor 512. Additionally, in other embodiments the remote USB device includes a printer, a facsimile, a camera, an audio device, a mass storage device, a scanner, and the like. As is apparent to those skilled in the art the a USB device can send data to the requesting device processor 512, as is the case with a scanner device. In this way, status 534 includes not only reporting information associated with a requested operation, but also any data associated with the requested operation.

Figure 6:
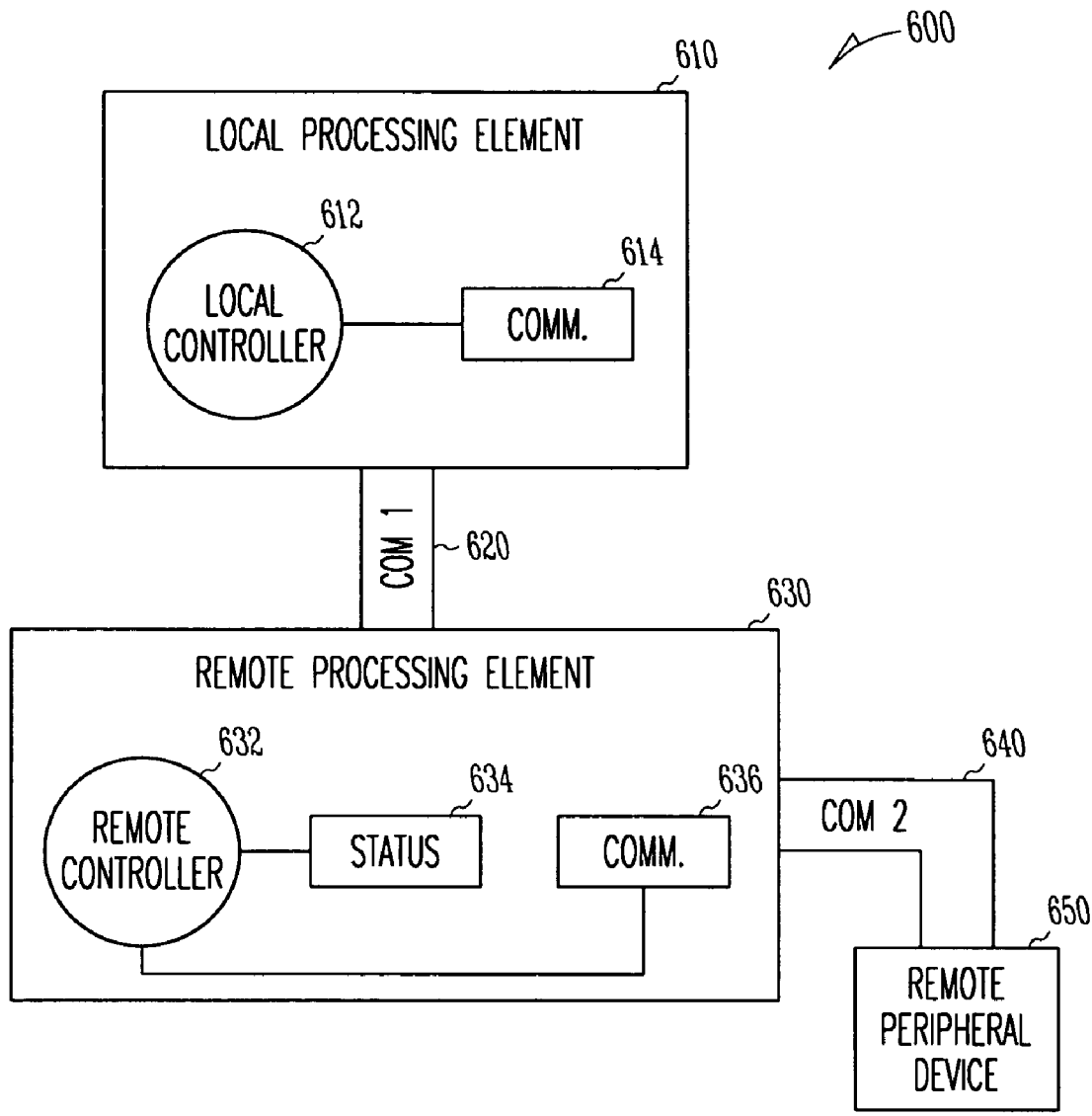
FIG. 6 shows one block diagram of a system capable of communicating with a remote USB device according to the present invention.

FIG. 6 shows one block diagram of one system 600 capable of communicating with a remote peripheral USB device 650. The system 600 includes a communications medium 620, a local processing element 610, a remote processing element 630, a remote USB peripheral device 650, and a local controller 612. The local controller 612 resides on the local processing element 610 and intercepts a communication 614 on the local processing element 610. The communication 614 is directed to a request to access the remote USB peripheral device 650. The communication 614 is delivered to the remote processing element 630 over communications medium 620. The local processing element 610 is not directly connected to the remote processing element 630 or the remote USB peripheral device 650.

The communications medium 620 includes one or more non-USB communication channels COM1, such as Internet channels, wireless channels, cable channels, POT Channels, satellite channels, radio frequency channels, infrared channels, and the like. Further, any network communication is used over COM1, such as TCP/IP. Moreover in some embodiments, the remote processing element 630 includes a remote controller 632 that receives a status 634 from the remote peripheral device 650 USB port 640 (e.g., COM2) and reports a result associated with the remote USB peripheral device's 650 processing of the transferred communication 636 to the local controller 612, which resides on the local processing element 610.

CONCLUSION

The methods and systems discussed above permit remote long distance processing of peripheral data, which originates from a local computing device. In contrast to the past, one can now access and interact with USB peripheral devices over a network without requiring additional hardware. In addition, the approach permits a myriad of end-user configurations of local computing devices and remote peripheral devices with minimal software modifications being required. As one skilled in the art will appreciate, this will permit small low cost remote controllers to be customized and affixed to existing USB peripheral devices, permitting these devices to become stand alone appliances capable of being remotely accessed across any network connection from a local computing device, according to the tenets of the present invention.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A universal serial bus (USB) controller, comprising:
 a first port for interfacing with a requesting device over a wide area network( WAN);
 a second port for interfacing with a USB device over a local area network (LAN); and
 instructions, implemented within the controller, adapted to receive USB data on the first port from the requesting device and adapted to associate the USB data with the USB device and to send the USB data on the second port to the USB device for processing, and wherein the controller is located within a local environment of the second port and is remote from the first port over the WAN and wherein the USB device is a peripheral computing device.

2. The USB controller of claim 1, wherein the instructions are further adapted to receive status associated with processing the USB data on the second port from the USB device and adapted to send the status on the first port to the requesting device.

3. The USB controller of claim 1 further comprising, a plurality of additional ports associated with additional USB devices.

4. The USB controller of claim 1, wherein the WAN is the Internet.

5. The USB controller of claim 1, wherein the first port is a wireless port.

6. The USB controller of claim 1, wherein the USB data is generated on the requesting device in response to an intercepted request which is directed to the USB device.

7. A remote Universal Serial Bus (USB) system, comprising:
   a requesting device;
   a USB controller; and
   a USB device, wherein the requesting device attempts to send peripheral data to the USB device, which is located remote from the requesting device over a wide area network (WAN), and wherein the peripheral data is intercepted on the requesting device and packaged into USB data, the requesting device sends the USB data over the WAN to the USB controller, and the USB controller forwards the USB data to the USB device for processing in formats and communications expected by the USB device, wherein the USB controller and the USB device are interfaced with one another over a local area network (LAN).

8. The remote USB system of claim 7, wherein the USB controller is adapted to receive status from the USB device, wherein the status is associated with processing the USB data, and wherein the USB controller forwards the status to the requesting device over the WAN.

9. The remote USB system of claim 7, wherein the USB controller is adapted to interface with a plurality of additional requesting devices over the WAN and a plurality of additional USB devices over the LAN.

10. The remote USB system of claim 7, wherein communication over the WAN is at least one of wired and wireless.

11. The remote USB system of claim 7, wherein the requesting device lacks a USB port.

12. The remote USB system of claim 11, wherein the requesting device includes a local controller that generates the USB data and sends the USB data over the WAN to the USB controller.

13. The remote USB system of claim 7, wherein the WAN uses a Transmission Control Protocol (TCP) and Internet Protocol (IP) for its communications.

14. A method, comprising:
    receiving a request from a remote requesting device over a wide area network (WAN), wherein the request is in a first format and is directed to a universal serial bus (USB) device;
    rendering the first format to a USB format, unless the first format is already in the USB format; and
    forwarding the request in the USB format to the USB device for servicing in a format and communication expected by the USB device and as determined and resolved in a local environment of the USB device.

15. The method of claim 14, wherein forwarding further includes placing the USB formatted request onto a USB stack memory accessible by a USB host controller.

16. The method of claim 14, wherein forwarding further includes transmitting the request to the USB device over a USB.

17. The method of claim 14 further comprising, receiving a response associated with the request from the USB device.

18. The method of claim 17 further comprising, transmitting the response to the remote requesting device.

19. The method of claim 14 further comprising, processing the method as a USB controller that interfaces the remote requesting device to the USB device over the WAN.

20. The method of claim 14, wherein forwarding further includes forwarding the USB formatted request to the USB device via a wireless communication channel.

21. A method, comprising:
    issuing, on a requesting device, a Universal Serial Bus (USB) request, wherein the requesting device lacks USB support;
    interrupting processing, on the requesting device, when the USB request is detected; and
    transmitting the USB request over a wide-area network (WAN) to a USB controller, wherein the USB controller processes the USB request on a target USB device and wherein the USB controller is in a local environment of the USB device.

22. The method of claim 21 further comprising, packaging the USB request into a USB format on the USB controller prior to processing on the target USB device.

23. The method of claim 21 further comprising, receiving a response for the USB request on the requesting device from the USB controller.

24. The method of claim 21, wherein receiving further includes, receiving the USB request on a personal computer (PC) which is the requesting device.

25. The method of claim 21, wherein transmitting further includes, identifying from the USB request the USB target device, and wherein the USB target device is a peripheral device interfaced to the USB controller.

* * * * *